Nov. 18, 1941.    H. R. WARNKE    2,263,373
SIGNAL GENERATOR
Filed Aug. 8, 1940    2 Sheets—Sheet 1
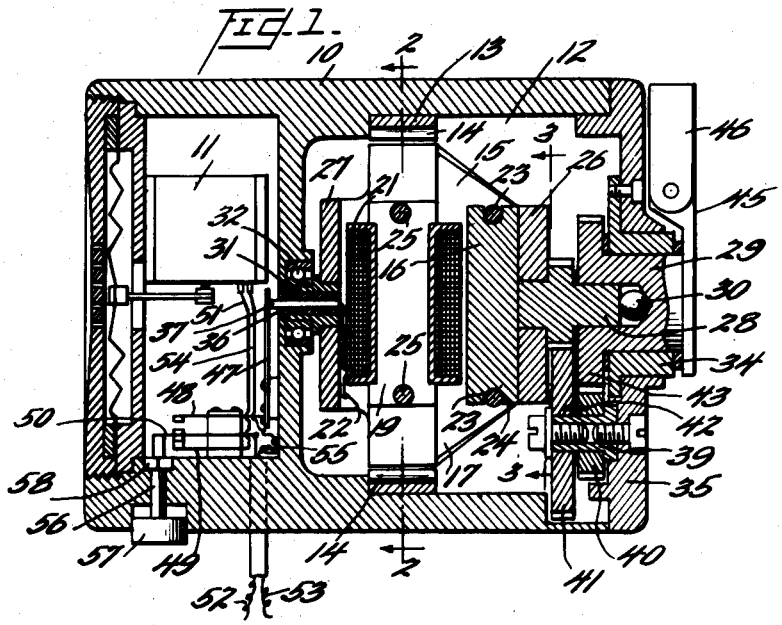
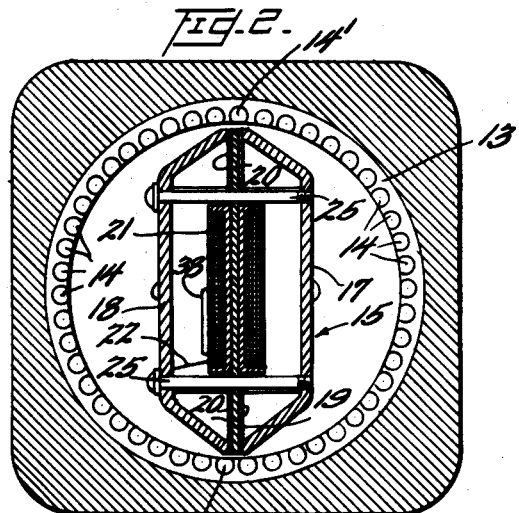
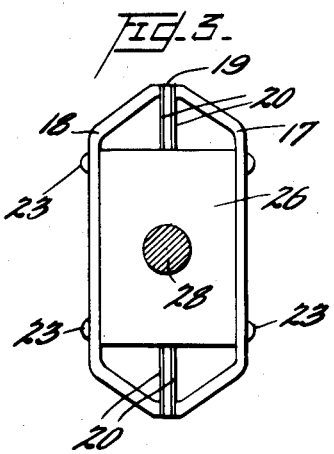
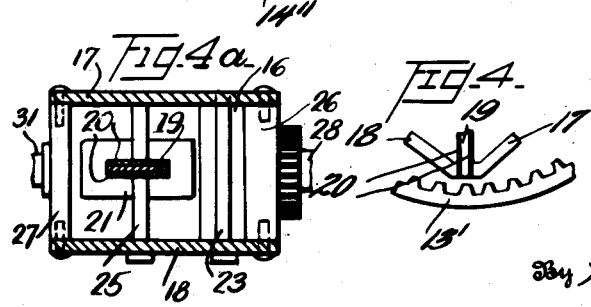
Inventor
Herbert R. Warnke
By Watson, Cole, Grindle & Watson
Attorney

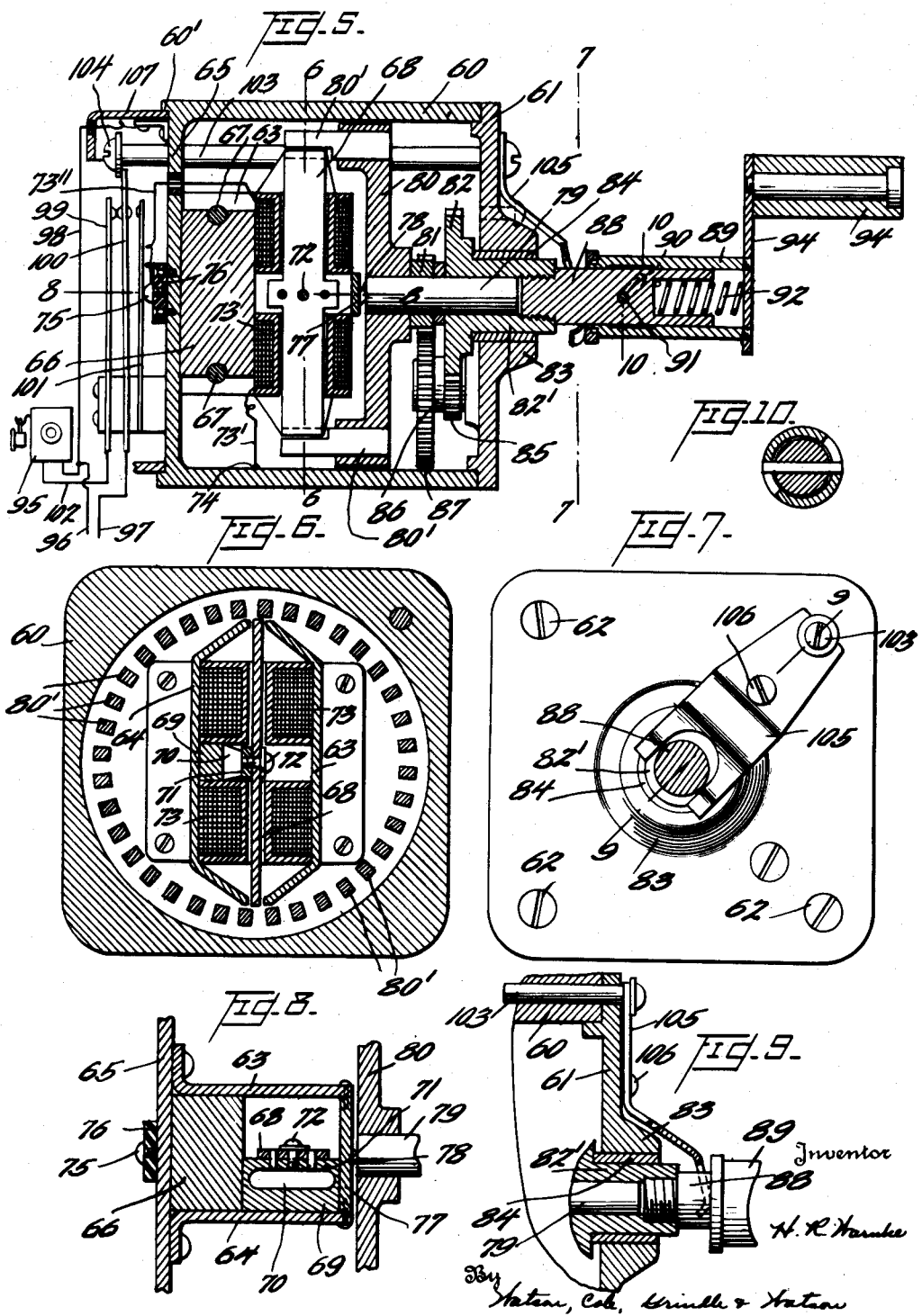

Patented Nov. 18, 1941

2,263,373

UNITED STATES PATENT OFFICE 2,263,373

SIGNAL GENERATOR

Herbert R. Warnke, East Orange, N. J., assignor to United States Instrument Corporation, East Orange, N. J., a corporation of New Jersey Application August 8, 1940, Serial No. 351,787

12 Claims. (Cl. 171—209)

The present invention relates to alternating current generators and particularly to manually operated generators of the permanent magnet type, adapted for the production of an alternating current of a suitable frequency for direct conversion into sound energy in the audible range. Such generators, which may be generally classified as signal generators, are commonly used in communication and signalling systems operable without batteries or other external sources of energy. In such uses, the generator of the present invention may be combined with a telephone receiving and transmitting instrument, or may be used separately to generate a signal current for giving a signal through the medium of a loud speaker or other instrument for converting electrical energy into sound energy. This application is a continuation-in-part of my copending application Serial No. 290,922, filed August 18, 1939 which describes and claims the subject matter of Figures 1–4A inclusive of the present application.

It is the general object of the present invention to provide a signal generator of novel, compact and inexpensive design, having considerably more power than previous generators of the general type in question and of comparable size.

Previous generators of the same general type have employed toothed rotors which are revolved in close proximity to one end of a stationary armature and, to a certain extent, such devices produce the same result as that sought by the present invention, but by reason of the novel construction of the generator to be hereinafter described, in which both ends of the armature are employed for alternately opening and closing gaps in the magnetic circuit, the flux density in the armature and the rate of change are greatly increased, with a corresponding increase in the signal current generated.

Another signal generator heretofore known employs a fixed armature and a toothed rotor disposed adjacent each end of the armature. In this case, the generated signal current is stronger than in the case of a single toothed rotor at one end of the armature, but the device employing two toothed rotors is bulky and expensive.

In some of the combined telephone and signal generator devices heretofore known, the telephone instrument and the generator have been constantly connected, with the result that when the generator is operated, the audible signal is reproduced in the adjacent instrument, where it serves no purpose, and the value of the signalling current furnished to the instrument at the other end of the line is correspondingly diminished.

With the foregoing considerations in view, it is an object of the invention to provide a generator of the type in question comprising an armature assembly consisting of an armature disposed between two pole-pieces, a coil surrounding the armature, and a magnet for polarizing the pole-pieces, and a field member surrounding the rotor and provided with a plurality of magnetic elements arranged in close proximity to the ends of the armature, so that when the armature assembly and field member are rotated relative to each other, an alternating magnetic flux is established in the armature, generating an alternating current in the coil.

A further object of the invention is the provision of a telephone unit comprising a casing, a receiving and transmitting instrument supported in the casing, a signal generator likewise supported within the casing, means whereby the receiving and transmitting instrument is normally connected to the telephone conductors leading to another station, and manually operable means for disconnecting the receiving and transmitting instrument and connecting the signal generator to the telephone conductors for furnishing a signalling current to said conductors.

A further object is the provision of a signal generator of the nature described above, embodying automatic switching means operatively connected with the handle of the generator, for connecting the generator into a telephone circuit when the handle is turned, at the same time disconnecting the local telephone instrument from said circuit, said automatic switching means being adapted to disconnect the generator and reconnect the telephone instrument when the handle of the generator is released.

A further object is the provision, in a signal generator of the type described, of a novel field member comprising a ring of non-magnetic material having a circular series of magnetic inserts therein, the purpose of which is to avoid loss of power due to flux leakage.

Other and further objects, features and advantages of the present invention will be apparent to one skilled in the art from the following description taken in connection with the accompanying drawings in which:

Figure 1 is a longitudinal section through a telephone unit including a signal generator according to the present invention;

Figure 2 is a transverse section on line 2—2 of Figure 1;

Figure 3 is a section on line 3—3 of Figure 1;

Figure 4 is a fragmentary detail view showing a modification of the stator element;

Figure 4A is a horizontal section on line A—A of Figure 3;

Figure 5 is a longitudinal section through a modified form of signal generator, in which the armature assembly is stationary and the field member is rotated;

Figure 6 is a transverse section on line 6—6 of Figure 5;

Figure 7 is a transverse section on line 7—7 of Figure 5;

Figure 8 is an enlarged fragmentary horizontal section on line 8—8 of Figure 5;

Figure 9 is an enlarged fragmentary section on line 9—9 of Figure 7; and

Figure 10 is a transverse section on line 10—10 of Figure 5.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figure 1, the telephone unit there illustrated comprises generally a casing 10 in which is supported a telephone transmitting and receiving instrument 11 and a signal generator indicated generally at 12. The telephone instrument is preferably of the batteryless type, a suitable instrument being described and illustrated in the Turnbull and Warnke application filed December 4, 1937, Serial No. 178,150, now Patent No. 2,245,511, June 10, 1941. The details of the transmitting and receiving instrument, however, form no part of the present invention, and will not be further described.

The signal generator comprises a stator and a rotor, the stator 13 having a cylindrical outer surface of a diameter to fit closely within the casing 10. The preferred form of stator 13 is illustrated in Figure 2 and comprises a ring of non-magnetic material, such as brass or the like, having a continuous series of spaced magnetic inserts 14, a portion of each insert being exposed on the inner periphery of the stator.

The rotor, which is indicated generally by the reference character 15, comprises a permanent magnet 16 of high coercive force disposed between opposed pole-pieces 17 and 18, and an armature 19 clamped between the pole tips of the pole-pieces 17 and 18 but magnetically insulated therefrom by means of brass spacers 20. A coil 21 surrounds the armature 19 and is grounded to one of the pole-pieces as at 22. The entire assembly is held together by screws, the screws 23 extending from pole-piece to pole-piece, and engaging in grooves 24 formed in the upper and lower edges of the magnet 16. The screws 25 likewise extend from pole-piece to pole-piece, through suitable apertures formed in the armature 19, and serve to maintain the coil 21 in place on the armature. Obviously, the screws 23 and 25 must be of non-magnetic material. The pole-pieces are also spaced and insulated by means of non-magnetic spacers 26 and 27 which are secured in place between like ends of the opposed pole-pieces, by means of screws (see Figure 4A). A stub shaft 28 is secured centrally of the non-magnetic spacer 26 and is journalled in the combination bearing and gear member 29, an anti-friction thrust bearing 30 being preferably provided between the end of the shaft 28 and the member 29. The member 29 is in turn journalled in a bushing 34 mounted in the rear wall 35 of the casing 10. Similarly, a hollow shaft 31 secured centrally of the non-magnetic spacer 27 is journalled is an anti-friction bearing 32 mounted in the transverse partition 33 of the casing 10. The hollow shaft 31 is provided with an internal insulating bushing 36 through which extends an electrically conducting pin 37 to which one lead 38 of the coil 21 is connected, the other lead, as mentioned above, being grounded to the rotor at 22.

A bearing sleeve 39 is supported on the rear wall 35 of the casing 10 and carries a small gear 40 and a large gear 41, which are loosely mounted thereon, the gears 40 and 41 being pinned together as at 42. The gear 40 meshes with a gear 43 formed on the member 29, while the gear 41 meshes with a small gear 44 formed on the shaft 28. A crank 45 secured to the outer end of the member 29, and provided with a pivoted handle portion 46 provides means for revolving the rotor 12 through the medium of the gears 43, 40, 41 and 44.

The pin 37, to which the lead 38 of the coil 21 is connected, makes constant contact with a spring contact member 47 which in turn is electrically connected to a spring contact member 48. Two additional spring contact members 49 and 50 are adapted to be normally engaged, thereby electrically connecting the lead 51 of the transmitting and receiving instrument to the incoming conductor 52. The other incoming conductor 53 and the other lead 54 of the transmitting and receiving instrument are grounded to the casing as at 55.

The plunger 56, having an enlarged head 57, is slidably mounted in a suitable aperture through the wall of the casing 10, and extends into engagement with the spring contact member 50, outward displacement of the plunger being prevented by means of a nut 58. Since the coil 21 is grounded to the rotor at 22, and the latter makes good electrical connection with the casing through the spacers 26 and 27, the bearings, and the gear train, it will be apparent that when the plunger 56 is in the position illustrated in Figure 1, the transmitting and receiving instrument is electrically connected to the incoming conductors 52 and 53, but if the plunger 56 is elevated so as to disengage the spring contact members 49 and 50, and engage the latter with the contact member 48, the transmitting and receiving instrument will then be disconnected and the coil 21 will be connected to the incoming conductors 52 and 53.

The alternating flux which causes the generation of the signalling current is established in the armature 19 in the following manner. Referring to Figure 2, the elements 14 are so spaced about the stator 13 that at the time when any element 14, such as the element 14' in Figure 2, is in a position to complete the shortest magnetic path between the pole-piece 17 and the upper end of the armature 19, another element, such as the element 14", is in position to form a part of the shortest magnetic path between the pole-piece 18 and the opposite or lower end of the armature 19. That being so, the shortest magnetic path (i. e. the path having the smallest air gaps) between the pole-piece 17 and the pole-piece 18 will be established through the magnetic element 14', downwardly through the armature 19, through the magnetic element 14" and into the adjacent pole tip of the pole-piece 18. This will remain true until the upper end of the armature passes the center of the element 14', at which time the lower end of the armature also passes the center of the element 14". When this happens the shortest magnetic path from the pole-piece 17 to the pole-piece 18 will be established from the lower tip of the pole-piece 17 through the element 14", upwardly through the armature 19 to the magnetic element 14' and thence to the upper tip of the pole-piece 18. Thus it will be seen that during each revolution of the rotor the magnetic flux in the armature 19 passes through a number of cycles equal to the number of the magnetic elements 14 in the stator. From this it follows that the generated frequency depends upon the number of magnetic elements in the stator, the gear ratios employed, and the speed with which the handle 46 is turned, and the device is accordingly adaptable to the production of a wide range of frequencies. If a constant frequency is desired, a small electric motor may be employed for revolving the rotor.

In the operation of the signal generator as described, the handle 46 is grasped and revolved, preferably at a speed of about four revolutions per second. The two small gears 40 and 44 may, for example, have twenty teeth each and the two larger gears 41 and 43 may have fifty-four teeth. In this case, if the handle is rotated at four revolutions per second, the rotor will revolve at approximately twenty-nine revolutions per second. Preferably about forty magnetic elements 14 are provided in the stator 13, and the frequency of the generated signal current will therefore be about 1160 cycles per second, which is a suitable frequency for direct conversion into sound energy.

If desired, for reasons of convenience or otherwise, the form of stator illustrated in Figure 4 may be employed. The stator 13' of Figure 4 consists of an internally toothed ring of magnetic material, and is preferably laminated. When this form of stator is used, the entire stator being of magnetic material, there will be a certain amount of flux leakage between the opposing pole-pieces of the rotor, the flux passing from one pole-piece into the adjacent tooth of the stator and out through the next tooth of the stator to the opposing pole-piece. Obviously, the flux passing by this route is not available for generating a current in the coil surrounding the armature.

It will be obvious that it is only necessary to produce a relative rotation between the rotor 12 and stator 13, and in certain applications it may be desirable to maintain the armature assembly stationary and rotate the member 13, or to rotate both members in opposite directions.

In the modification illustrated in Figures 5-10 the armature assembly is stationary, and means are provided for rotating the "field" or magnetic member which surrounds the armature assembly. In this form of the device, the generator comprises a casing 60 adapted to be closed by a cover plate 61, which may be secured in place by any suitable means, such as screws 62. The pole-pieces 63 and 64 are secured to the end wall 65 of the casing, as best seen in Figure 8, the magnet 66 being interposed between the pole pieces as in the previous case. The magnet 66 is preferably held in place by means of non-magnetic screws 67 extending between the pole-pieces and lying in grooves formed in the upper and lower surfaces of the magnet. As best seen in Figures 6 and 8, the armature 68 is not clamped between the pole tips, as in the form of generator illustrated in Figures 1-4, but is rigidly secured to the armature suspension 69 which is in turn secured to the adjacent pole piece 64 as by means of screws. The armature suspension 69 is slotted as at 70 to provide a relatively thin bridge portion 71 to which the armature 68 is secured by means of the screw 72. By reason of this arrangement, the armature, which is itself rigid, is permitted a slight amplitude of vibration, the purpose of which will be hereinafter explained. A series-connected pair of coils 73 surrounds the armature and has one of its leads 73' grounded to the casing 60 as at 74, the other lead 73" extending outwardly of the casing and connecting to the contact point 75, which is insulated from the casing 60 by a block 76 of insulating material. The inner ends of the pole-pieces 63, 64 are connected by a bridge member 77, which carries a small conical protuberance 78 which serves as a thrust bearing for the rotating mechanism, which will now be described.

The rotating or field structure comprises a shaft 79 on which is secured a disc 80 and a gear 81. The shaft 79 is journalled in the sleeve 82' of a gear 82, which in turn is journalled in the boss 83 of the cover plate 61. Preferably an anti-friction bushing 84 separates the gear 82 and the boss 83. The gear 82 meshes with a small gear 85 which is secured on a stub shaft 86 journalled in the cover plate 61. The shaft 86 also carries a gear 87 which meshes with the gear 81 secured on the shaft 79.

The outer end of the sleeve 82' is internally threaded to receive the threaded portion of a crank-shaft 88. It will be readily understood that when the latter is rotated by external means, the disc 80 is driven at high speed through the gears 82, 85, 87, and 81.

The crank-shaft 88 has a pin and slot connection with a crank sleeve 89, the slots 90 which cooperate with the pin 91 being inclined so as to cause the sleeve 89 to move inwardly (to the left in Figure 5) upon being turned in a clockwise direction relative to the shaft 88. The sleeve 89 is normally maintained in its outward position by the spring 92. A crank arm 93, secured to the outer end of the sleeve 89 has journalled thereon a handle member 94. It will be apparent that when the latter is grasped and the crank rotated in the clockwise direction, the sleeve 89 first moves inwardly relative to the shaft 88, after which the latter is rotated, driving the disc 80 in the manner heretofore described.

The disc 80 is provided with a circular series of magnetic elements 80', which extend into close proximity to the respective ends of the armature 68, and as the disc 80 is rotated, a high-frequency alternating current is generated in the coil 73 in the manner described in connection with the device of Figures 1-4. It is to be noted, however, that the present modification is somewhat more efficient than the device of Figures 1-4, for the reason that the armature 68, being free to vibrate somewhat, will move so as to reduce the air gap between each end of the armature and the approaching element 80', this movement being reversed so as to maintain the reduced air gap as the element passes the respective armature end. In this way, a greater magnetic flux is caused to pass through the armature than would otherwise be the case, and accordingly a higher potential is generated in the coil 73. Also, the magnetic elements 80' are so shaped as to overlie the entire end surface of the armature and a small part of the adjacent edge, thus decreasing the reluctance of the magnetic circuit.

It should also be noted that the present type of armature suspension, possessing the aforesaid advantage, may be employed in lieu of that illustrated in Figures 1-4, in the device in which the armature is rotated and the field member is stationary.

In order that the signal generator just described may be automatically connected into the telephone circuit, and the local telephone instrument disconnected, switching means are provided as illustrated in Figure 5 in which the reference character 95 designates the local telephone instrument and the numerals 96, 97 designate the conductors extending to the station to be called. It will be seen that one conductor 98 leading from the instrument 95 is grounded on the casing 60 of the signal generator. Three spring contact members 99, 100 and 101 are mounted exteriorly of the casing 60 and suitably insulated from each other. The spring contact member 101 is in constant engagement with the contact point 75, and is thereby electrically connected to the lead 73" of the coil 73. A conductor 102 extends from the instrument 95 to the spring contact member 99. The remaining spring contact member 100 is connected to the conductor 97 which leads to the remote station. The conductor 96 which also leads to the remote station, connects with the conductor 98 extending from the instrument 95 to the casing of the signal generator. When the spring contact member 100 is in the position illustrated in Figure 5, the instrument 95 is connected in the circuit leading to the remote station, and the signal generator is disconnected from said circuit. However, when the spring contact member 100 is moved to the right, so as to engage contact member 101, the instrument 95 is disconnected from the circuit and the signal generator is connected into the circuit. This result is brought about automatically by means of the slide 103, which extends through the casing 60 and is provided with a head 104 for engagement with the free end of the spring contact member 100. The opposite end of the slide 103 is engaged by the forked end of a rock lever 105, the latter being secured to the cover plate 61, by means of a screw 106, in such a manner as to permit it to partake of the necessary rocking movement. The bifurcated inner end of the rock lever 105 embraces the crank-shaft 88, and is adapted to be engaged by the crank sleeve 89 as the latter moves inwardly as previously described.

From the foregoing description it will be apparent that when the handle 94 is grasped and rotated in a clockwise direction, the sleeve 89 moves inwardly, rocking the lever 105 and causing the slide 103 to move to the right in Figure 5, thus springing the contact member 100 out of engagement with contact member 99 and into engagement with contact member 101. When the handle is released, the spring 92 causes the sleeve 89 to move outwardly, permitting the spring contact member 100 to re-engage contact member 99, moving the slide 103 to the left as it does so.

For the purpose of protecting the spring contact members, a rear cover plate 107 is provided, and has a friction fit with the inner surface of the flange 60' of the casing 60. The conductors 97, 98 and 102 extend through suitable apertures in the plate 107.

Having thus described the invention, what is claimed as new and desired to be secured by Letters Patent is:

1. In an alternating current generator, an armature assembly comprising a pair of opposed pole-pieces, an armature, a permanent magnet disposed between said pole-pieces for polarizing the same, and a coil surrounding said armature; a member encircling said armature assembly and having a circular series of spaced magnetic elements; and means for producing relative rotation between said armature assembly and said member, said armature assembly and member being so constructed and arranged that upon said relative rotation said magnetic elements and the respective ends of said armature assembly pass each other in close proximity and in such space relation as to cause an alternating magnetic flux to flow in said armature whereby an alternating current is generated in said coil.

2. In an alternating current generator, a rotor comprising a pair of opposed pole-pieces, an armature clamped between but spaced and magnetically insulated from said pole-pieces, a permanent magnet disposed between said pole-pieces for polarizing the same, and a coil surrounding said armature; a rotor comprising a member having a circular series of spaced magnetic elements adapted to pass in close proximity to the ends of said armature; and means for revolving said rotor to cause an alternating magnetic flux to flow through said armature whereby an alternating current is generated in said coil.

3. In an alternating current generator, a rotor comprising a pair of opposed pole-pieces, an armature supported between said pole-pieces and having its ends spaced between opposing pole-tips, a permanent magnet disposed between said pole-pieces for polarizing the same, and a coil surrounding said armature; a stator comprising a member having a circular series of spaced magnetic elements disposed in close proximity to the orbit of the ends of said armature, said magnetic elements being so spaced that when one of said elements forms a part of the shortest magnetic circuit between one end of said armature and one of said pole-pieces, another of said elements forms a part of the shortest magnetic circuit between the opposite end of said armature and said other pole-piece, and vice versa; and means for revolving said rotor to cause an alternating magnetic flux to flow through said armature whereby an alternating current is generated in said coil.

4. An alternating current generator according to claim 3, said stator member comprising an internally toothed ring of magnetic material.

5. An alternating current generator according to claim 3, said stator member comprising a ring of non-magnetic material having spaced inserts of magnetic material.

6. In an alternating current generator, an armature assembly comprising a pair of opposed pole-pieces, an armature supported between said pole-pieces and having its ends spaced between opposing pole-tips, a permanent magnet disposed between said pole-pieces for polarizing the same, and a coil surrounding said armature; a member encircling said armature assembly and having a circular series of spaced magnetic elements; and means for producing relative rotation between said armature assembly and said member, said armature assembly and member being so constructed and arranged that upon said relative rotation said magnetic elements and the respective ends of said armature assembly pass each other in close proximity and in such space relation as to cause an alternating magnetic flux to flow in said armature whereby an alternating current is generated in said coil.

7. In an alternating current generator, an armature assembly comprising a pair of opposed pole-pieces, a substantially rigid armature supported between said pole-pieces and having its ends spaced between opposing pole-tips, said armature being mounted for limited vibratory movement relative to said pole-pieces, a permanent magnet disposed between said pole-pieces for polarizing the same, and a coil surrounding said armature; a member encircling said armature assembly and having a circular series of spaced magnetic elements; and means for producing relative rotation between said armature assembly and said member, said armature assembly and member being so constructed and arranged that upon said relative rotation said magnetic elements and the respective ends of said armature assembly pass each other in close proximity and in such space relation as to cause an alternating magnetic flux to flow in said armature whereby an alternating current is generated in said coil.

8. In an alternating current generator, a stator comprising a pair of opposed pole-pieces, an armature supported between said pole-pieces and having its ends spaced between opposing pole-tips, a permanent magnet disposed between said pole-pieces for polarizing the same, and a coil surrounding said armature; a rotor comprising a member having a circular series of spaced magnetic elements adapted to pass in close proximity to cause an alternating magnetic flux to flow through said armature whereby an alternating current is generated in said coil.

9. In an alternating current generator, a rotor comprising a pair of opposed pole-pieces, an armature supported between said pole-pieces and having its ends spaced between opposing pole-tips, a permanent magnet disposed between said pole-pieces for polarizing the same, and a coil surrounding said armature; a stator comprising a member having a circular series of spaced magnetic elements disposed in close proximity to the orbit of the ends of said armature, said magnetic elements being so spaced that when one of said elements forms a part of the shortest magnetic circuit between one end of said armature and one of said pole-pieces, another of said elements forms a part of the shortest magnetic circuit between the opposite end of said armature and said other pole-piece, and vice versa; and means for revolving said rotor to cause an alternating magnetic flux to flow through said armature whereby an alternating current is generated in said coil.

10. An alternating current generator according to claim 6, said encircling member comprising an internally toothed ring of magnetic material.

11. An alternating current generator according to claim 6, said encircling member comprising a ring of non-magnetic material having spaced inserts of magnetic material.

12. An alternating current generator according to claim 6, said encircling member comprising a disc of non-magnetic material having spaced axially projecting teeth of magnetic material.

HERBERT R. WARNKE.